US008958532B2

(12) United States Patent      (10) Patent No.: US 8,958,532 B2
Kritt et al.      (45) Date of Patent: Feb. 17, 2015

(54) NAVIGATING AN INTERACTIVE VOICE RESPONSE SYSTEM

(75) Inventors: Barry A. Kritt, Raleigh, NC (US);
Thomas A. Mazzeo, Durham, NC (US);
Sarbajit K. Rakshit, Kolkata (IN);
Shawn K. Sremaniak, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 88 days.

(21) Appl. No.: 13/306,556

(22) Filed: Nov. 29, 2011

(65) Prior Publication Data

US 2013/0136244 A1    May 30, 2013

(51) Int. Cl.
*H04M 11/00*      (2006.01)

(52) U.S. Cl.
USPC ..................................... 379/88.18; 379/88.01

(58) Field of Classification Search
USPC ............... 379/114.13, 218.01, 265.01–266.1, 379/88.01, 88.18
See application file for complete search history.

(56) References Cited

U.S. PATENT DOCUMENTS

| | | | |
|---|---|---|---|
| 5,893,902 A * | 4/1999 | Transue et al. | 704/275 |
| 6,173,266 B1 * | 1/2001 | Marx et al. | 704/270 |
| 6,487,277 B2 * | 11/2002 | Beyda et al. | 379/88.01 |
| 6,614,885 B2 * | 9/2003 | Polcyn | 379/88.02 |
| 6,697,460 B2 | 2/2004 | Knott et al. | |
| 6,856,673 B1 * | 2/2005 | Banks et al. | 379/114.13 |
| 6,895,083 B1 * | 5/2005 | Bers et al. | 379/88.01 |
| 6,928,156 B2 * | 8/2005 | Book et al. | 379/265.01 |
| 7,065,188 B1 | 6/2006 | Mei et al. | |
| 7,092,888 B1 * | 8/2006 | McCarthy et al. | 704/277 |
| 7,231,379 B2 * | 6/2007 | Parikh et al. | 1/1 |
| 7,363,212 B2 * | 4/2008 | Erhart et al. | 704/2 |
| 7,421,389 B2 * | 9/2008 | Reynolds et al. | 704/235 |
| 7,451,089 B1 * | 11/2008 | Gupta et al. | 704/270.1 |
| 7,490,286 B2 * | 2/2009 | Commarford et al. | 715/200 |
| 7,502,742 B2 | 3/2009 | Knott et al. | |
| 7,599,861 B2 * | 10/2009 | Peterson | 705/26.7 |
| 2004/0122941 A1 | 6/2004 | Creamer et al. | |
| 2007/0036332 A1 * | 2/2007 | Busayapongchai | 379/265.09 |
| 2010/0226489 A1 | 9/2010 | Sarkar et al. | |

OTHER PUBLICATIONS

Perugini et al., A Study of Out-of-turn Interaction in Menu-based, IVR, Voicemail Systems, Proceedings of the SIGCHI Conference on Human Factors in Computing Systems 2007, pp. 961-970.

* cited by examiner

*Primary Examiner* — Simon Sing
(74) *Attorney, Agent, or Firm* — Lieberman & Brandsdorfer, LLC

(57) ABSTRACT

Embodiments of the invention relate to effectively traversing the structure of an interactive voice response system. A menu associated with the system is organized and arranged in a hierarchy. Each received input is dynamically analyzed to enable a traversal of the hierarchy and to direct the input to an appropriate menu option associated with the system. The appropriate menu option is directly related to the input submission, and supports a direct communication with a telecommunication device that initiated communication with the system.

16 Claims, 4 Drawing Sheets

NAVIGATING AN INTERACTIVE VOICE RESPONSE SYSTEM

BACKGROUND

1. Technical Field

The present invention relates to a method and system for navigating an automatic interactive voice response system. More specifically, the invention relates to a system and method that dynamically analyzes a submission to the voice response and refines a menu option from the voice response system corresponding to the analysis.

2. Description of the Prior Art

Interactive voice response system, hereinafter referred to as IVR, is a technology that allows a computer to interact with humans through the use of sound and input from a keypad. IVR systems are commonly employed to service high call volumes as it enables a component to direct received calls to an appropriate location. In response to a received call, the IVR is known to present the caller with a menu of options, known as a tree, and the caller must navigate through the tree with one or more responses. Once navigation through the tree has started, the user must listen and remember the selection of options that are presented by the IVR for each step in the call tree. Often, the caller has to listen to all of the options presents at a given step before making a selection from the menu to insure that the best option is selected. If a mistake is made by the called in the option selection, then the caller must go back to a prior position in the tree to repeat one or more prior steps. Accordingly, the IVR requires a call to navigate the tree, and more specifically, menu options presented in the tree.

SUMMARY OF THE INVENTION

This invention comprises a method, system, and apparatus for dynamic analysis of a submission to an IVR to mitigate or eliminate menu navigation.

In one aspect, a computer implemented method is provided for directing an input submission to a target menu option of an IVR. An input submission from a telecommunication device is received by the IVR. The input submission is dynamically analyzed with metadata that describes a collection of menu options of the IVR; the menu options are organized in a hierarchy. A subset of menu options from the IVR collection is returned to the telecommunication device. At least one of the returned menu options supports a direct call to from the telecommunication device.

In another aspect, a system is provided with a processing unit in communication with memory. The processing unit supports an IVR. A functional unit is provided in communication with the processing unit, with the functional unit to support dynamic analysis of an input submission to the IVR. The functional unit is provided with an analysis manager, a selection manager, a rank manager, a profile manager, and a marketing manager. The analysis manager functions to dynamically analyze an input submission with metadata that describes a collection of hierarchically organized menu options of the IVR. The selection manager, which is in communication with the analysis manager, functions to returns a subset of menu options from the collection, with the subset directed to the input submission. At least one menu option from the subset supports a direct communication with a recipient.

In yet another aspect, a computer program product is provided for supporting the IVR. The computer program product includes a computer-readable storage medium having computer readable program code embodied thereon, which when executed causes a computer to implement a method pertaining to dynamic analysis of an input submission to the IVR. An input submission is received by the IVR. In response to receipt, the input submission is dynamically analyzed with metadata that describes a collection of hierarchically organized menu options of the IVR. Based upon the analysis of the input submission, a subset of menu options is returned. At least one of the returned menu options enables a direct communication to a telecommunication device.

In an even further aspect, a method is provided for supporting communication between a telecommunication device and an IVR. A selection of menu options of the IVR is organized into a hierarchy. The IVR receives an input submission from the telecommunication device and automates traversal of the IVR. The aspect of traversal includes parsing the hierarchy of menu options based upon the input submission. At least one subset of menu options is returned to the telecommunication device, with one of the menu options to enable a direct recipient communication with the IVR.

Other features and advantages of this invention will become apparent from the following detailed description of the presently preferred embodiment of the invention, taken in conjunction with the accompanying drawings.

BRIEF DESCRIPTION OF THE DRAWINGS

The drawings referenced herein form a part of the specification. Features shown in the drawings are meant as illustrative of only some embodiments of the invention, and not of all embodiments of the invention unless otherwise explicitly indicated. Implications to the contrary are otherwise not to be made.

DETAILED DESCRIPTION

Figure 1:
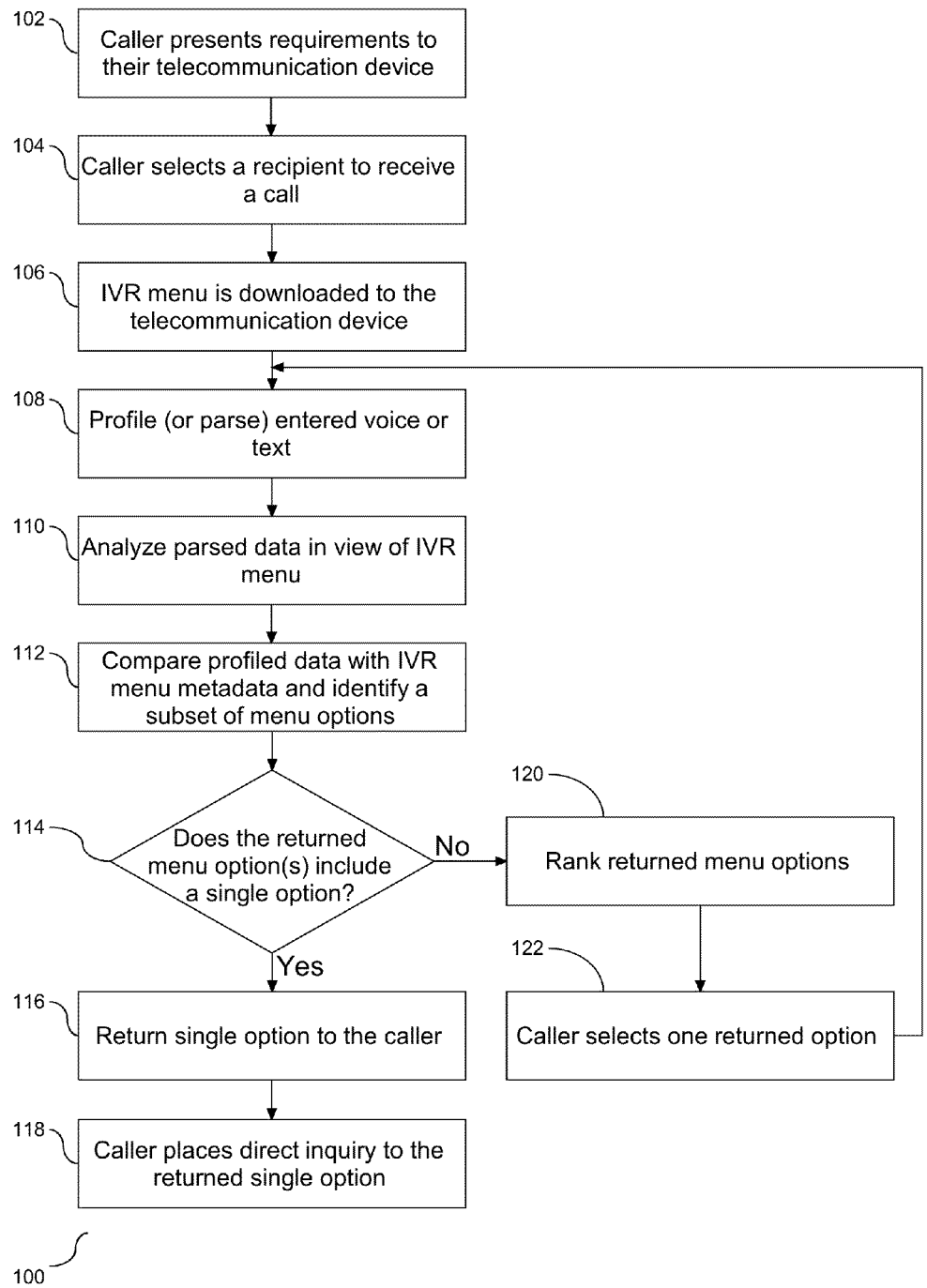
FIG. 1 is a flow chart illustrating a process for managing a communication directed to an IVR from a telecommunication device.

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

The functional unit described in this specification have been labeled with managers. The functional unit may be implemented in programmable hardware devices such as field programmable gate arrays, programmable array logic, programmable logic devices, or the like. The functional unit may also be implemented in software for execution by various types of processors. An identified functional unit of executable code may, for instance, comprise one or more physical or logical blocks of computer instructions which may, for instance, be organized as an object, procedure, function, or other construct. Nevertheless, the executables of an identified functional unit need not be physically located together, but may comprise disparate instructions stored in different locations which, when joined logically together, comprise the functional unit and achieve the stated purpose of the functional unit.

Indeed, a functional unit of executable code could be a single instruction, or many instructions, and may even be distributed over several different code segments, among different applications, and across several memory devices. Similarly, operational data may be identified and illustrated herein within the functional unit, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of modules, managers, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

In the following description of the embodiments, reference is made to the accompanying drawings that form a part hereof, and which shows by way of illustration the specific embodiment in which the invention may be practiced. It is to be understood that other embodiments may be utilized because structural changes may be made without departing form the scope of the present invention.

IVR systems have become abundantly popular for managing large call volumes. At the same time, frustration with traversing the IVR and its associated menu of options has grown. Accordingly, there is a need for a tool to dynamically manage an IVR system to direct a caller to an appropriate recipient.

FIG. 1 is a flow chart (100) illustrating a process for managing a communication directed to an IVR from a telecommunication device. Calls are received by IVR systems for a variety of reasons. In general, a large enterprise employs an IVR to address large call volumes and to automate resolution of the calls while minimizing human interaction. The greater the quantity of received calls that can be resolved through automation, the less human interaction and associated expense results. Prior to initiating the communication to the IVR, the caller presents their call requirements to their telecommunication device they intend to use to call the IVR (102). The requirements may be presented orally or through a text based entry. The process of entering the requirements functions to outline the needs of the caller prior to communication with the IVR.

Following step (102), the caller selects a recipient to receive a call in an effort to address the entered requirements (104). In one embodiment, the recipient is a call center for an enterprise organization. In response to receipt of the call, the IVR menu is downloaded to the telecommunication device that transmitted the initial communication to the IVR (106). To address the downloaded menu and identification of an appropriate recipient of the call, the entered voice or text based data is profiled to ascertain the subject matter and context of the call to the IVR (108). The profiling involves parsing the voice and or text provided at step (102). Parsing the entered data may include, but is not limited to, subject matter entered, use of punctuation marks, negative words, semantic analysis of the entry to ascertain mood or emotion, possible keywords or phrases in the data, etc.

The parsed data is analyzed in view of the IVR menu (110). More specifically, each menu option includes metadata describing the specific menu option. Based upon the profiling at step (108), the parsed input data is compared with the menu option metadata to identify and return a subset of menu options of the IVR that may be applicable to the entered voice or data (112). In one embodiment, the profiling may be based upon the tone, language, and/or content of the inquiry. Each of these characteristics may be presented orally or via text based communication. For example, the profiling may detect anger in the entered data and may return a select submenu of the IVR that pertains to an agitated caller. Accordingly, a subset of menu options of the IVR is returned in an effort to direct the subject of the call inquiry to an appropriate destination.

The returned subset may include one option available for selection, thereby directing the caller to a single location within the IVR. However, in one embodiment, the caller may be directed to a subset of menu options that includes multiple options. As disclosed above, the menu options are organized in a hierarchy. Similarly, the subset of menu options reflects the hierarchy of the menu prior to parsing. Following step (112) it is determined if the returned menu option(s) includes a single option (114). The determination at step (114) demonstrates the aspect of addressing the returned subset. In one embodiment, the determination may be inverted to test for multiple options. A positive response to the determination at step (114) is followed by returning the single menu option to the caller (116). The caller may then place an inquiry directly to the single menu option (118). Alternatively, a negative response to the determination at step (114) is an indication that multiple menu options are available. To direct the caller to an appropriate menu option, the multiple options are ranked and the ranking is presented to the caller (120).

The ranking presented at step (120) may be responsive to both the interpretation of the inquiry and the hierarchical arrangement of the identified subset within the hierarchy of the IVR. In one embodiment, the returned subset may be arranged in a hierarchy with the position of each item in the hierarchy determined by the closeness of the menu options to the submission that has been analyzed. The caller has the option to select one of the multiple ranked options (122), followed by a return to step (108). Specifically, each time a new menu is presented, steps (108)-(114) are executed unto the IVR resolves the customer's response to a single option. Accordingly, the hierarchical arrangement of the menu options embedded within the IVR enables the caller to identify and select an appropriate destination. Accordingly, the hierarchy functions to direct a caller to a single menu option or a ranking of multiple options, with the ranking responsive to the hierarchy of the IVR.

Figure 2:
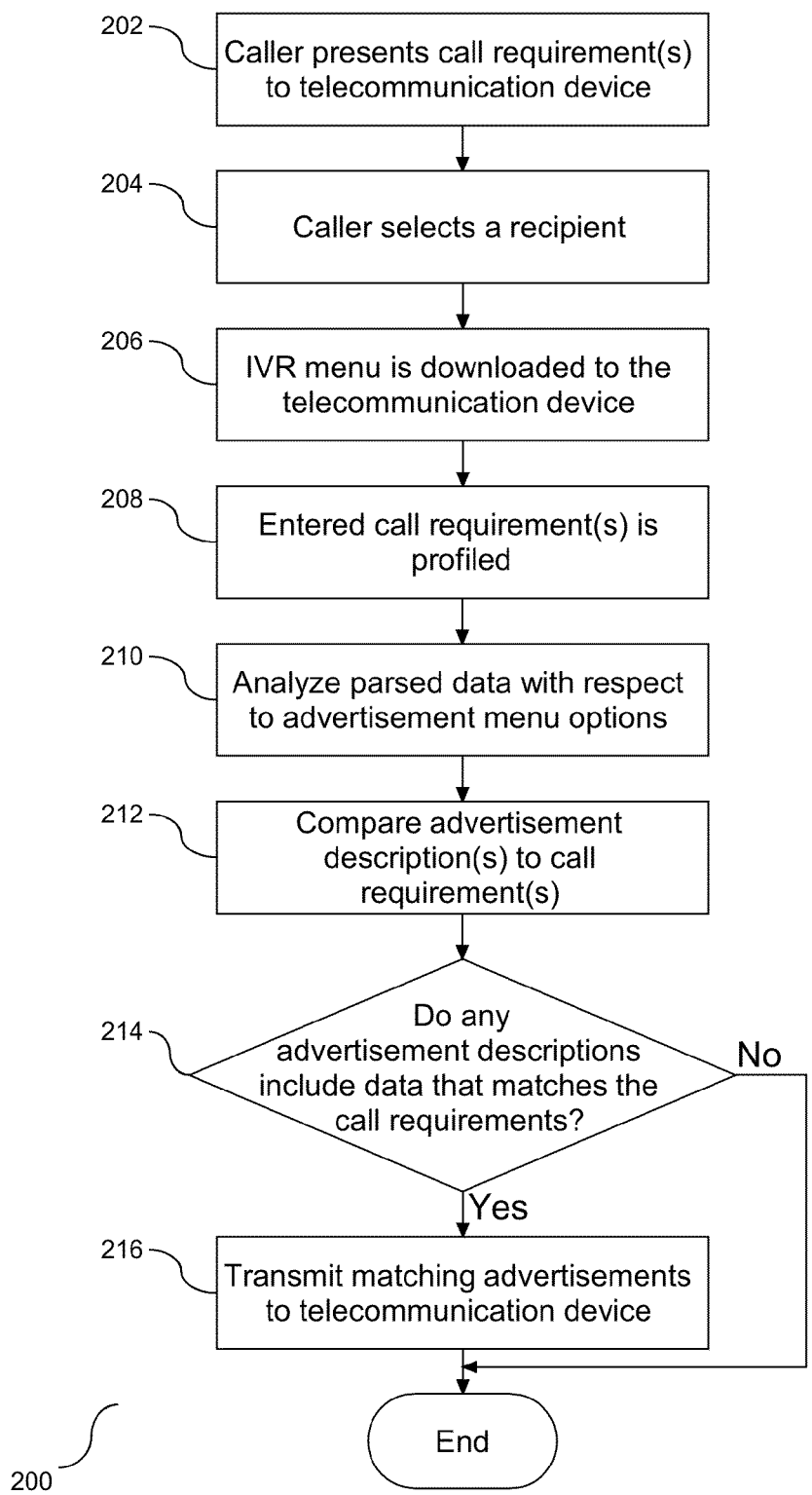
FIG. 2 is a flow illustrating a process for selecting and communicating one or more advertisements in response to an IVR submission.

In addition to directing a caller to a menu option or a submenu of options, one or more advertisements may also be communicated to the caller, with the advertisement(s) selected responsive to the profile. FIG. 2 is a flow chart (200) illustrating a process for selecting and communicating one or more advertisements in response to an IVR submission. Prior to initiating the communication to the IVR, the caller presents their call requirements to their telecommunication device they intend to use to call the IVR (202). The requirements may be presented orally or through a text based entry. The process of entering the requirements functions to outline the needs of the caller prior to communication with the IVR.

Following step (202), the caller selects a recipient to receive a call in an effort to address the entered requirements (204). In one embodiment, the recipient is a call center for an enterprise organization. In response to receipt of the call, the IVR menu is downloaded to the telecommunication device that transmitted the initial communication to the IVR (206). To address the downloaded menu and identification of an appropriate recipient of the call, the entered voice or text based data is profiled to ascertain the subject matter and context of the call to the IVR (208). The profiling involves parsing the voice and or text provided at step (202). Parsing the entered data may include, but is not limited to, subject matter entered, use of punctuation marks, negative words, semantic analysis of the entry to ascertain mood or emotion, possible keywords or phrases in the data, etc.

The parsed data is analyzed in view of one or more advertisements to be presented to the caller (210). More specifically, each advertisement includes a description, which is compared to the profile of the caller or subject of the communication (212). It is then determined if any of the advertisement descriptions include data that relate to the profile of the caller or the subject of the communication (214). A positive response to the determination at step (214) is followed by transmitting the advertisements determined to be relevant to the profile to the telecommunication device that initiated communication with the IVR (216). Conversely, a negative response to the determination at step (214) concludes the advertisement evaluation for the communication. Accordingly, the IVR may direct that one or more advertisements determined to be relevant are selected, with the determination based upon the analysis of the initial communication to the IVR and the profile created in response to the initial communication.

As illustrated above, an input submission to the IVR is dynamically analyzed to direct a call to an appropriate menu item within the IVR, and in one embodiment to direct a related advertisement to the caller. Submissions to the IVR are by their very nature unique. More specifically, each submission may have different characteristics, including tone of voice, intonations, etc. The dynamic analysis of the submission functions to direct the caller to a relevant menu option so that the caller can efficiently utilize the functionality of the IVR. Accordingly, as shown in FIGS. 1 and 2, a method is provided for dynamically targeting an inquiry to the IVR.

Figure 3:
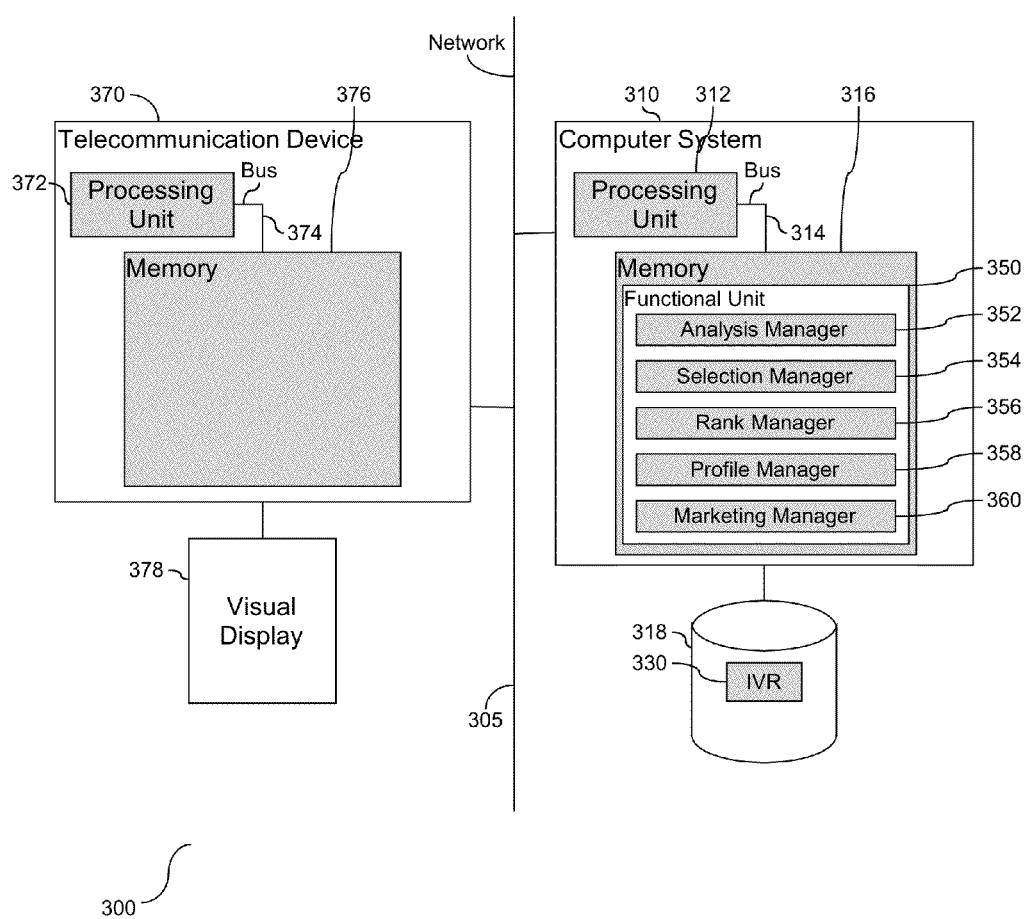
FIG. 3 is a block diagram illustrating tools embedded in a computer system to support the functionality of an IVR and targeted communication therewith.

FIGS. 1 and 2 illustrated above demonstrate different aspects associated with targeted communication associated with an IVR, both with respect to directing a communication to a specific menu option within the IVR and to directing an appropriately defined advertisement to the caller. FIG. 3 is a block diagram (300) illustrating tools embedded in a computer system to support the functionality of an IVR and targeted communication therewith. As shown, a computer system (310) is provided with a processing unit (312) in communication with memory (316) across a bus (314) in communication with data storage (318). In one embodiment, data storage (318) may be remote from the system (310). The computer system (310) is in communication with a telecommunication device (370) across a network (305). As shown, the telecommunication device (370) has a processing unit (372) in communication with memory (376) across a bus (374), and including a visual display (378).

An IVR (330) is provided in the computer system. In one embodiment, the IVR (330) is maintained in the data storage (318). The system (310) is provided with a functional unit (350) in communication with the IVR (330). More specifically, the functional unit (350) includes tools to support targeted communication between the telecommunication device (370) and the system (310). The tools include, but are not limited to, an analysis manager (352), a selection manager (354), a rank manager (356), a profile manager (358), and a marketing manager (360).

The analysis manager (352) is responsible for analyzing an input submission received from the telecommunication device (370). In one embodiment, the analysis of the input submission is based upon input in the form of tone, language, and/or content of the inquiry. The analysis manager (352) utilizes metadata of the IVR describing a collection of available menu options which are organized in a hierarchy. The selection manager (354), which is in communication with the analysis manager (352), returns a subset of menu options from the collection of available menu options of the IVR. At least one menu option from the returned subset is directed to support a direct recipient communication from the device (370). Accordingly, the analysis manager (352) and the selection manager (354) function to receive and process an input submission responsive to the hierarchical organization of a menu and associated menu options within the IVR (330).

The rank manager (356) is shown in communication with the analysis manager (352). As explained above, a subset of menu options are identified and returned to the communication device (370). To ascertain and identify relevant menu options, the rank manager (356) orders the subset of menu options based upon their locations(s) in the hierarchy of the IVR. In one embodiment, the position of each item in the subset is based upon the closeness of the menu options to the analyzed submission. The profile manager (358) is shown in communication with the analysis manager (352). The profile manager (358) functions to create a profile for the caller, with the profile based upon an analysis of characteristics of the input as received by the IVR. In addition, the profile manager (358) parses the menu options of the IVR based upon characteristics of the profile. Accordingly, the menu options of the IVR are further narrowed with the support of the profile manager (358), and more specifically, with the parsing of the IVR menu in response to the created caller profile.

As shown the flow charts above, the aspect of efficiently navigating the IVR may be combined with sales and marketing. More specifically, a marketing manager (360) is provided in communication with the rank manager (356). The marketing manager (360) functions to select one or more advertisements to the communication device employed by the caller. The goal is to select the advertisement(s) based upon the subject of the input. In one embodiment, the aspect of selecting advertisement(s) is based upon one or more of the characteristics of the caller profile. Accordingly, the marketing manager (360) may selectively direct advertisement(s) to the input device.

As shown herein, the managers (352)-(360) of the functional unit (350) are provided local to the system (310), and more specifically, residing in memory (316) of the system (310). In one embodiment, the managers may reside as hardware tools external to memory (316), or they may be implemented as a combination of hardware and software. Similarly, in one embodiment, the managers may be combined into a single functional item that incorporates the functionality of the separate items. As shown herein, each of the manager(s) is shown local to one data site. However, in one embodiment they may be collectively or individually distributed across a shared pool of configurable computer resources and function as a unit to manage one or more tasks and task related activity in real-time. Accordingly, the managers may be implemented as software tools, hardware tools, or a combination of software and hardware tools.

As will be appreciated by one skilled in the art, aspects of the present invention may be embodied as a system, method or computer program product. Accordingly, aspects of the present invention may take the form of an entirely hardware based embodiment, an entirely software based embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
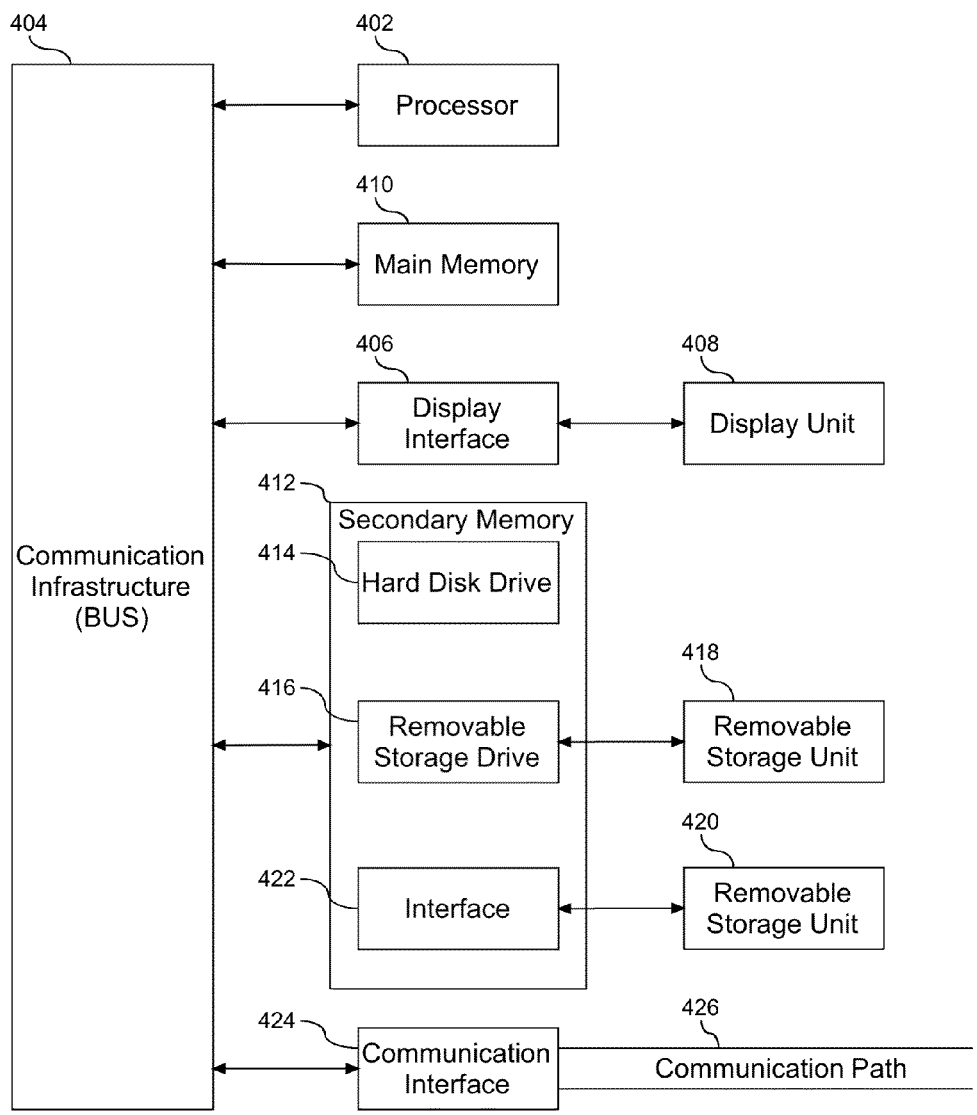
FIG. 4 depicts a block diagram showing a system for implementing an embodiment of the present invention.

Referring now to the block diagram of FIG. 4, additional details are now described with respect to implementing an embodiment of the present invention. The computer system includes one or more processors, such as a processor (402). The processor (402) is connected to a communication infrastructure (404) (e.g., a communications bus, cross-over bar, or network).

The computer system can include a display interface (406) that forwards graphics, text, and other data from the communication infrastructure (404) (or from a frame buffer not shown) for display on a display unit (408). The computer system also includes a main memory (410), preferably random access memory (RAM), and may also include a secondary memory (412). The secondary memory (412) may include, for example, a hard disk drive (414) and/or a removable storage drive (416), representing, for example, a floppy disk drive, a magnetic tape drive, or an optical disk drive. The removable storage drive (416) reads from and/or writes to a removable storage unit (418) in a manner well known to those having ordinary skill in the art. Removable storage unit (418) represents, for example, a floppy disk, a compact disc, a magnetic tape, or an optical disk, etc., which is read by and written to by removable storage drive (416). As will be appreciated, the removable storage unit (418) includes a computer readable medium having stored therein computer software and/or data.

In alternative embodiments, the secondary memory (412) may include other similar means for allowing computer programs or other instructions to be loaded into the computer system. Such means may include, for example, a removable storage unit (420) and an interface (422). Examples of such means may include a program package and package interface (such as that found in video game devices), a removable memory chip (such as an EPROM, or PROM) and associated socket, and other removable storage units (420) and interfaces (422) which allow software and data to be transferred from the removable storage unit (420) to the computer system.

The computer system may also include a communications interface (424). Communications interface (424) allows software and data to be transferred between the computer system and external devices. Examples of communications interface (424) may include a modem, a network interface (such as an Ethernet card), a communications port, or a PCMCIA slot and card, etc. Software and data transferred via communications interface (424) are in the form of signals which may be, for example, electronic, electromagnetic, optical, or other signals capable of being received by communications interface (424). These signals are provided to communications interface (424) via a communications path (i.e., channel) (426). This communications path (426) carries signals and may be implemented using wire or cable, fiber optics, a phone line, a cellular phone link, a radio frequency (RF) link, and/or other communication channels.

In this document, the terms "computer program medium," "computer usable medium," and "computer readable medium" are used to generally refer to media such as main memory (410) and secondary memory (412), removable storage drive (416), and a hard disk installed in hard disk drive (414).

Computer programs (also called computer control logic) are stored in main memory (410) and/or secondary memory (412). Computer programs may also be received via a communication interface (424). Such computer programs, when run, enable the computer system to perform the features of the present invention as discussed herein. In particular, the computer programs, when run, enable the processor (402) to perform the features of the computer system. Accordingly, such computer programs represent controllers of the computer system.

The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed.

Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Alternative Embodiment

It will be appreciated that, although specific embodiments of the invention have been described herein for purposes of illustration, various modifications may be made without departing from the spirit and scope of the invention. Accordingly, the scope of protection of this invention is limited only by the following claims and their equivalents.

We claim:

1. A computer implemented method comprising:
    receiving, by an interactive voice response system, an input submission from a telecommunication device;
    dynamically analyzing the input submission with metadata describing a collection of menu options of the interactive voice response system organized into a hierarchy;
    returning, from the interactive voice response system, a subset of menu options dynamically chosen from the collection of menu options to the telecommunication device, wherein the subset of menu options are a function of the input submission;
    arranging the subset of menu options in a hierarchical manner with a position of each item in the hierarchy responsive to closeness of the menu options to the analyzed submission; and
    ranking the subset of menu options, based upon a location in the hierarchy indicated by the input submission,
    wherein a first menu option from the subset of menu options enables a direct call from the telecommunication device.

2. The method of claim 1, wherein the step of analyzing the input submission is based on the following characteristics of the input: tone, language, content, and combinations thereof.

3. The method of claim 1, further comprising creating a profile for a caller in response to analyzing the characteristics of the input, and parsing the menu options based upon characteristics of the profile.

4. The method of claim 3, further comprising selecting an advertisement for presentation to the telecommunication device, wherein the selection is based upon characteristics of the profile.

5. The method of claim 1, wherein the input is selected from the group consisting of: text and voice.

6. A system comprising:
a processing unit in communication with memory, the processing unit to support an interactive voice response system;
a functional unit in communication with the processor, the functional unit comprising:
an analysis manager to dynamically analyze an input submission with metadata describing a collection of menu options of the interactive voice response system organized into a hierarchy;
a selection manager in communication with the analysis manager, the selection manager to return a subset of menu options dynamically chosen from the collection of menu options of the interactive voice response system, wherein the subset of menu options is a function of the input submission;
a rank manager in communication with the analysis manager, the rank manager to arrange the subset of menu options in a hierarchical manner with a position of each item in the hierarchy responsive to closeness of the menu options to the analyzed submission; and
the rank manager to rank the subset of menu options with the rank based upon a location in the hierarchy indicated by the input submission,
wherein a first menu option from the subset of menu options supports a direct recipient communication.

7. The system of claim 6, wherein the analysis manager analyzes the input submission based upon a characteristic of the input selected from the group consisting of: tone, language, content, and combinations thereof.

8. The system of claim 7, further comprising a profile manager in communication with the analysis manager, the profile manager to create a profile for a caller in response to analysis of the characteristics of the input, and to parse the menu options based upon characteristics of the profile.

9. The system of claim 8, further comprising a marketing manager in communication with the rank manager, the marketing manager to select an advertisement for presentation to a telecommunication device commissioned to send the input to analysis manager, wherein the advertisement selection is based upon at least one characteristic of the profile.

10. The system of claim 6, wherein the input is selected from the group consisting of: text and voice.

11. A computer program product comprising a computer readable storage device having computer readable program code embodied thereon, which when executed causes a computer to implement the method comprising:

receiving, by an interactive voice response system, an input submission;
dynamically analyzing the input submission with metadata describing a collection of menu options of the interactive voice response system, the menu options organized into a hierarchy; and
returning, from the interactive voice response system, a subset of menu options dynamically chosen from the collection of menu options, wherein the subset of menu options are a function of the input submission;
arranging the subset of menu options in a hierarchical manner with a position of each item in the hierarchy responsive to closeness of the menu options to the analyzed submission, and ranking the subset of menu options based upon a location in the hierarchy indicated by the input submission, wherein a first menu option from the subset of menu options enables a direct communication with a telecommunication device.

12. The computer program product of claim 11, wherein analyzing the input submission is based on characteristics of the input selected from the group consisting of: tone, language, content, and combinations thereof.

13. The computer program product of claim 11, further comprising creating a profile for a caller in response to analyzing the characteristics of the input, and parsing the menu options based upon characteristics of the profile.

14. The computer program product of claim 11, further comprising selecting an advertisement for presentation to a telecommunication device, wherein the selection is based upon characteristics of the profile.

15. The computer program product of claim 11, wherein the input is selected from the group consisting of: text and voice.

16. A method comprising:
organizing a selection of menu options of an interactive voice response system into a hierarchy;
receiving, by the interactive voice response system, an input submission; and
automating traversal of the interactive voice response system, including the interactive voice response system parsing the hierarchy of menu options and returning a subset of menu options dynamically chosen from the selection responsive to the hierarchy, arranging the subset of menu options in a hierarchical manner with a position of each item in the hierarchy responsive to closeness of the menu options to the analyzed submission, and ranking the subset of menu options based upon a location in the hierarchy indicated by the input submission, wherein one of the menu options from the subset enables a direct recipient communication.

* * * * *